June 28, 1966  H. KARBIN  3,258,290

ELONGATED BICYCLE SEAT

Filed Feb. 23, 1965

INVENTOR.
Henry Karbin,
BY Parker & Carter
Attorneys.

United States Patent Office 3,258,290
Patented June 28, 1966

3,258,290
ELONGATED BICYCLE SEAT
Henry Karbin, 2447 W. Lunt Ave., Chicago, Ill.
Filed Feb. 23, 1965, Ser. No. 434,331
6 Claims. (Cl. 297—195)

This invention relates to cycle seats and particularly relates to an elongated seat adapted to be mounted on a bicycle.

An object of this invention is an elongated seat for a bicycle or the like with an improved construction incorporating spring action.

Another object is an elongated seat with improved and economical resiliency built into the general construction.

Another object is an elongated cycle seat in which a spring action can be built into the seat construction without requiring extensive coil springs or the like.

Another object is an elongated seat for bicycles or the like in which an elongated resilient member extends substantially along the end to end axis of the seat, which spring member yields in a space accommodated by a specially formed frame member.

Another object is an elongated seat wherein a resilient panel is yieldable with an elongated resilient member while, at the same time, providing a base for upholstery material and attachment points for upholstery covering material on the elongated seat.

Another object is a bicycle seat having an economical, improved resilient construction wherein an elongated member below the seat portion is slidable on inclined transverse support means to provide a spring action.

These objects are attained together with other objects which will become apparent from considering the following disclosure, including the drawings, wherein.

Figure 1:
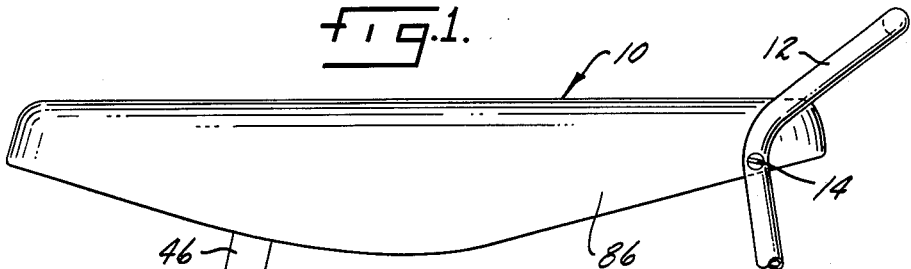
FIGURE 1 is a side elevational view of the bicycle seat.

An elongated bicycle seat is shown generally as 10 with a generally U-shaped bracket tube 12 fixed towards the back end of the seat by a screw 14. The use of such supporting bracket tubes are commonplace with elongated seats and the bottom ends of such bracket tubes may be modified to a flattened ring which is fitted over the threaded end of the wheel axle and locked in place by nuts (not shown).

Below the seat is seen a bracket assembly shown generally as 16 which includes a bracket collar 18 adapted to frictionally engage the end of the bicycle post 20. The usual nut and bolt assembly 22 is used to tighten the opening of the bracket collar 18.

Figure 2:
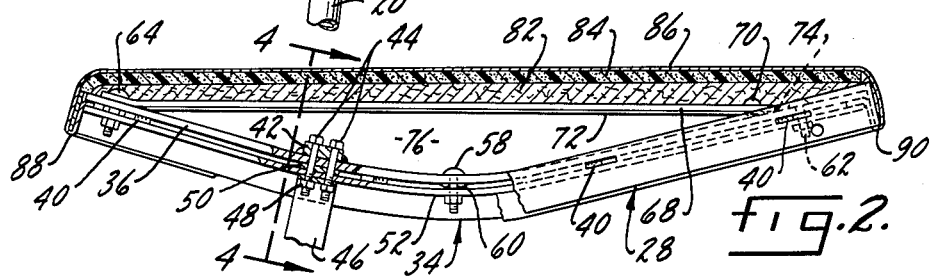
FIGURE 2 is a sectional view of FIGURE 1.
Figure 3:
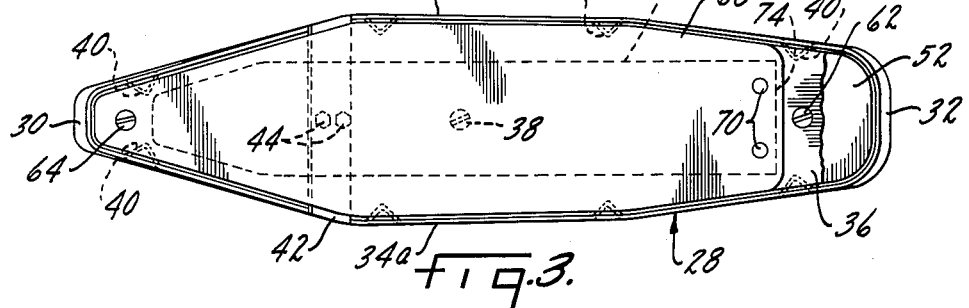
FIGURE 3 is a top plan view with parts removed and parts indicated by dotted line.
Figure 4:
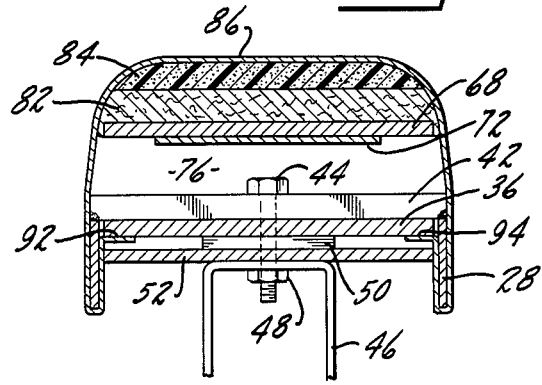
FIGURE 4 is a view along line 4—4 of FIGURE 2.

Referring now to FIGURES 2-4, details of the construction will be seen. The seat has an elongated continuous frame 28 which is disposed as a rigid loop. The ends of the loop are somewhat tapered with front end 30 having a more pronounced taper than back end 32. It is seen that ends, 30, 32 are raised relative to an intermediate lowered portion designated generally as 34. The opposed sides 34 and 34a which comprise the lowered portion lie generally in a common horizontal plane, and this lowered portion is preferably positioned slightly towards the front 30 of the frame.

Transverse support means extend between the sides of the looped frame and such support means may take various forms. For example, a substantially rigid support plate 36 may have a configuration conforming generally to the loop frame and may be supported on the frame by being seated on the plurality of indents such as 40 extending inwardly of the frame. Likewise, the transverse support means may include one or more crossbars such as 42 which may simply rest on the opposed sides of the loop frame or be connected thereto by welds or the like.

The illustrated embodiment shows a plurality of bolts such as 44 passing through the crossbar and connecting U-shaped bracket 46 of the bracket assembly by means of nuts such as 48. A spacer 50 may be used underneath the flexible support plate 36 and a flexible closure plate 52 may be mounted underneath the seat. The closure plate 52, if desired, does not function primarily as a support means but merely as a closure to complete a more esthetically pleasing seat. Such closure plate may be economical composition board which is sufficiently flexible for the purpose.

A plurality of nut and bolt connectors may be used to hold the transverse support plate 36 and closure 52 together. An intermediate connector assembly is shown at 58 with a disc locking clip 60. Another assembly is shown at 62 towards end 32 of the frame, and a nut and bolt assembly 64 is shown towards end 30 of the frame loop.

The nut and bolt assembly 64 at the front end 30 of the frame loop is also used to lock one end of a resilient panel 68. This panel is shown extending substantially along the full length of the seat and has a shape which conforms generally to the configuration of the seat. The other end of the panel is shown connected by double headed rivets 70 to an elongated resilient member 72. The resilient member extends substantially along the end to end axis of the elongated seat and has an opposed end 74 which is adapted to frictionally engage transverse support means 36. The double headed rivet on the underside of the resilient member facilitates oscillatory movement, or the yielding and return movements. The elongated resilient member may be a spring bar or may be made from other materials such as strong rigid plastics which have inherent resiliency. It is required that such an elongated resilient member be free to yield, and this is attained when at least one of the opposed ends of the resilient member is free to slide back and forth on the transverse support means. Only one free end is required for this yielding action but both ends can be free, as shown. The resilient member may be wedged at its opposed ends in the construction set up so that said member does not deflect substantially from the end to end axis of the seat. The resilient member yields in a space 76 provided by the lowered intermediate portion 34 of the loop frame. This space accommodates any yielding movements of the resilient member 72.

The resilient support panel 68 is further seen to have a wide dimension substantially greater than the wide dimension of the resilient member. This panel provides the base for upholstery material as well as a wider seating base for the user of the cycle seat. The upholstery material may include cotton tufting or the like 82 on top of the resilient panel, a spongy plastic sheet 84 on top of the cotton, and upholstery covering 86 which is turned down over the ends and sides of the seat and over the bottom edges of the frame as at 88 and 90. The ends of the upholstery covering may be attached in various ways, one of which is shown by turning the lower edge of the upholstery cover beyond the closure plate 52 and securing the edge of the upholstery cover to the bottom of the transverse support plate 36 by an adhesive or the like at 92 and 94. The various upholstery materials conform generally to the configuration of the cycle seat.

The use and operation of my invention are as follows:

An improved resilient spring action is provided through economical construction. The use of the elongated resilient member 72 provides a desirable level of spring action without requiring a more complicated construction using coil springs. The resilient action is provided by a combination of the loop frame with its lowered portion 34 which provides a space 76 to accommodate the yielding movement of the member 72.

The frame is a rigid continuous band shaped as an elongated loop and various rigid materials may be used such as steel. It is required that some transverse support means extend between the spaced sides of the frame to provide points where one of the opposed ends or both of the opposed ends of the resilient member may slide in its yielding and return movements. The transverse support means also provide mounting points for brackets and the like to engage elements such as a bicycle post, and the support means may hold nut and bolt assemblies to hold different parts of the seat construction such as the resilient support panel 80 and bottom closure panel 52. The support means may be used for various other things such as attachment points through the use of adhesive or the like for the upholstery cover 86. These and other suggestions will occur to those skilled in the art and it will be realized that said transverse support means need not take any particular configuration or form, for they may take the general shape of the cycle seat contour or they may be transverse crossbars intermittently positioned along the length of the frame, or both.

It would not be desirable for the position of the elongated resilient member to be deflected substantially from an alignment with the end to end axis of the seat, and this can be prevented in a variety of different ways. One of such ways is certainly to connect one end of the resilient member or to form a slot in one or both ends of the member and let it ride freely along a shank of a bolt or the like secured to the transverse support means. Likewise, the configuration of the resilient member may be designed so that there is little opportunity provided for deflection of said member relative to the sides of the frame loop. One way in which this could be done would be to make the resilient member sufficiently wide and taper it at its ends to conform generally to the tapered configuration of the frame member, thus allowing little room for deflection.

While the resilient member has been shown together with a resilent panel in the form of a resilient assembly, it need not necessarily be so. A single resilient member could be provided with a sufficient wide dimension to serve as a base or support for the upholstery material thereabove. It is, however, preferred to have the resilient assembly which includes a resilient panel having a wide dimension substantially greater than the wide dimension of the resilient member thereon. In this way, the resilient member may be designed from better materials such as spring metal, and the resilient panel may be designed from more economical resilient material such as rigid plastics or thin plywood or the like.

The foregoing invention can now be practiced, and such practitioners will know that the invention is not necessarily restricted to the particular embodiments presented herein. The scope of the invention is to be defined by the terms of the following claims as given meaning by the preceding description.

I claim:

1. An elongated seat for mounting on a bicycle or the like which includes a frame member, said frame member being a continuous rigid band formed generally as an elongated loop, the opposed ends of the loop being raised from an intermediate lowered portion, said intermediate lowered portion positioned towards one of the raised ends and lying in a generally horizontal common plane, transverse support means between the opposed sides of the frame member, an elongated resilient member extending generally along the end to end axis of the elongated seat, at least one end of said elongated member slidable on said transverse support means, a resilient panel joined to the elongated resilient member, said panel having a wide dimension substantially greater than the wide dimension of the elongated resilient member, said elongated resilient member and resilient panel having portions spaced away from the lowered portion of the frame member to accommodate yielding and return movements of the resilient member, means connecting the resilient panel to the transverse support means, upholstery material shaped generally to conform to the top of the seat positioned on top of the resilient panel, and means to secure said upholstery material to the resilient panel.

2. An elongated seat for mounting on a bicycle or the like which includes, a frame member, spaced sides on said frame member, raised ends on said frame member, said raised ends flanking a lowered intermediate portion, transverse support means, said resilient member spaced from the lowered intermediate portion of the frame member to accommodate yielding and return movements of the resilient member, said elongated resilient member having its opposite ends positioned on the support means, and at least one of said ends being movable to permit yielding and return movements of the yieldable member, upholstery material shaped generally to conform to the top of the seat, and means securing said upholstery material to the elongated seat.

3. An elongated seat for mounting on a bicycle or the like which includes, a frame member, spaced sides on said frame member, raised ends on said frame member, said raised ends flanking a lowered intermediate portion, transverse support means connected to the frame member, an elongated spring bar positioned at least partly on the support means, said spring bar spaced from the lowered intermediate portion of the frame member to accommodate yielding and return movements of the offset spring bar, a resilient support panel adjoining said spring bar, said support panel having a wide dimension substantially greater than the wide dimension of the spring bar, upholstery material shaped generally to conform to the top of the seat, and means securing said upholstery material to the elongated seat.

4. An elongated seat for mounting on a bicycle or the like which includes a frame member, said frame member being a continuous rigid band formed generally as an elongated loop, the opposed ends of said loops rising upwardly from an intermediate lowered portion, the intermediate portion having spaced members lying in a common generally horizontal plane, transverse support means connected to opposite sides of the frame member, an elongated resilient member positioned on the support means, at least one end of the resilient member freely positioned to permit at least limited oscillating movement along the end to end axis of the frame member, a substantial portion of the resilient member being spaced from the lowered intermediate portion of the frame member to accommodate yielding and return movements of the resilient member, a resilient panel adjoining the elongated resilient member, said resilient panel having a wide dimension substantially greater than the wide dimension of the elongated resilient member, at least one of the elongated resilient member being connected to the support means, at least one end of the resilient panel being connected to said support means, upholstery material shaped generally to conform to the top of the seat, and means securing at least a portion of said upholstery material to the resilient panel.

5. An elongated seat for mounting on a bicycle or the like which includes, a frame member, spaced sides on said frame member, raised ends on said frame member, said raised ends flanking a lowered intermediate portion, transverse support means connected to the frame member, an elongated resilient member lying generally along the end to end axis of said elongated seat, said intermediate portion of said resilient member spaced away from the lowered intermediate portion of said frame member to accommodate yielding and return movements of the resilient member, at least one of the opposite ends of said resilient member adapted to freely move relative to support means to permit said yielding and return movements, and seating means shaped generally to conform to the top of the seat.

6. An elongated seat for mounting on a bicycle or the like which includes a frame member, said frame member being a continuous rigid band formed generally as an elongated loop, the opposite ends of said loop rising upwardly from an intermediate lowered portion, said intermediate lowered portion having spaced members lying in a common substantially horizontal plane, transverse support means connected to opposite sides of said frame member, an elongated resilient member lying generally along the end to end axis of said elongated seat, a substantial intermediate portion of said elongated resilient member spaced away from the lowered portion of said frame member to accommodate yielding and return movements of the resilient member, at least one of the opposite ends of said resilient member adapted to freely move relative to said transverse support means to permit said yielding and return movement in the manner of limited oscillating movements between the raised loops of said frame member, upholstery material shaped generally to conform to the top of the seat, and means securing at least a portion of said upholstery material to the elongated seat.

References Cited by the Examiner

UNITED STATES PATENTS

| | | | |
|---|---|---|---|
| 478,184 | 7/1892 | Zimmer | 297—199 |
| 1,970,533 | 8/1934 | Brandt | 297—214 |
| 2,080,658 | 5/1937 | Duffy | 297—203 |
| 2,181,414 | 11/1939 | Anderson | 297—214 |
| 2,225,317 | 12/1940 | Mesinger | 297—214 |
| 3,146,024 | 8/1964 | Timms | 297—195 |

CASMIR A. NUNBERG, *Primary Examiner.*

FRANK B. SHERRY, *Examiner.*

J. T. McCALL, *Assistant Examiner.*